United States Patent [19]

Kobayashi et al.

[11] 4,263,030
[45] Apr. 21, 1981

[54] METHOD OF PRODUCING AN OPTICAL WAVEGUIDE MATERIAL

[75] Inventors: Ryuji Kobayashi, Urawa; Kuniaki Wakabayashi, Hasuda, both of Japan

[73] Assignee: Mitsubishi Kinsoku Kabushiki Kaisha, Tokyo, Japan

[21] Appl. No.: 92,044

[22] Filed: Nov. 7, 1979

[30] Foreign Application Priority Data

Nov. 20, 1978 [JP] Japan ................................ 53-143160

[51] Int. Cl.³ .......................................... C03B 37/025
[52] U.S. Cl. .......................................... 65/2; 65/3 R; 65/30 R; 65/31
[58] Field of Search ...................... 65/2, 30 R, 31, 3 R

[56] References Cited

U.S. PATENT DOCUMENTS

| 2,241,511 | 5/1941 | Greene | 65/31 |
| 3,980,459 | 9/1976 | Tingye Li | 65/30 R X |
| 4,116,653 | 9/1978 | Iruen | 65/31 X |

FOREIGN PATENT DOCUMENTS 48-83839 11/1973 Japan .
50-96238 7/1975 Japan .
51-71147 6/1976 Japan .

*Primary Examiner*—Arthur D. Kellogg
*Attorney, Agent, or Firm*—Edward J. Brenner

[57] ABSTRACT

In forming an optical waveguide, a method of passing a hydrogen free vapor containing a compound consisting of C,N,O,S, or Se and at least one halogen therewith between a silica core and spaced cladding material prior to heat fusing said core and cladding material together.

3 Claims, No Drawings

METHOD OF PRODUCING AN OPTICAL WAVEGUIDE MATERIAL

DISCLOSURE OF THE INVENTION

An improved rod-in-tube method for producing an optical waveguide material is disclosed, in which a hydrogen-free compound containing at least one selected from the group consisting of C, N, O, S, Se and at least one of halogens is passed in a vapor state through the clearance between a silica glass cladding material and a silica glass core material inserted thereinto prior to their fusion to vapor-phase treat the surfaces of these two materials under heating up to a high temperature for removing inpurities existing thereat as volatile halogenides and these vapor-phase treated two materials are immediately fused by heating up to a higher temperature to be pulled. The thus produced optical waveguide material is improved in the boundary condition of these two materials fused and therefore very low in light attenuation.

BACKGROUND OF THE INVENTION

The present invention relates to a method of producing an optical waveguide material (optical fiber) which is very low in light attenuation.

There is known a rod-in-tube method as a typical method of producing an optical waveguide material, which comprises inserting a silica glass rod (a core material) into a silica glass tube (a cladding material), fusing the core material and the cladding material by heating and pulling the fused core material and cladding material.

This method, however, has the defect that the optical fiber thus produced is high in light attenuation, because the boundary formed by the fusion of the core material and the cladding material is apt to be contaminated with airfoams and impurities.

In order to resolve this defect, prior to the insertion of the core material into the cladding material, these two materials were respectively mechanically or chemically polished or heat-treated to purify the surfaces thereof, for example, in a germ-free room, but the fact was that as the core material and the cladding material thus treated were again exposed to the air in the subsequent handing, reattachment of impurities to the surfaces of these two materials could not be avoided.

BRIEF SUMMARY OF THE INVENTION

It is an object of the present invention to provide a method for producing an optical waveguide material in which light attenuation is remarkably lowered by improving the boundary condition of the core material and the cladding material. According to the present invention, there is provided a following method of producing an optical waveguide material: In the method of producing an optical waveguide material which comprises inserting a silica glass core material into a silica glass cladding material previously mechanically or chemically polished or heat treated resprctively, making said core material and said cladding material fused by heating and pulling said fused core material and cladding material, improvements comprising passing a hydrogen-free compound containing at least one selected from the group consisting of C, N, O, S, Se and at least one of halogens in a vapor state through the clearance between said core material inserted and said cladding material prior to the fusion thereof and vapor-phase treating the surfaces of said core material and said cladding material respectively with said hydrogen-free compound under heating up to a high temperature.

The above and further objects and features of the invention will more fully appear from the following detailed description.

DETAILED DESCRIPTION OF THE INVENTION

In the present invention, the hydrogen-free compound which contains at least one selected from the group consisting of C, N, O, S, Se and at least one of halogens and passes in a vapor state through the clearance between the cladding material and the core material inserted prior to the fusion thereof acts as a vapor-phase treating agent when heated up to a high temperature and removes impurities existing at the inner surface of the cladding material and the surface of the core material as volatile halogenides, thereby making the boundary condition formed by the fusion of the two materials improved and the light attenuation of the optical fiber thus produced remarkably lowered.

The vapor-phase treating agents used in the present invention are illustrated as follows: $CF_4$, $CCl_4$, $C_2Cl_4$ $CBr_4$, $CCl_2F_2$, $CClF_3$, $SF_6$, $SCl_4$, $S_2Br_2$, $SOF_2$, $SOCl_2$, $SO_2Cl_2$, $SeF_6$, $SeCl_4$, $Se_2Br_2$, $SeOCl_2$, $SeOF_2$, $OF_2$, $N_3F$, and $F_2N_4$.

These vapor-phase treating agents can be also used with a carrier gas such as $N_2$, He.

When the vapor-phase treating agent contains fluorine, it removes impurities existing at the surfaces of the core material and the cladding material as volatile fluorides as mentioned above and at the same time can also make a new purified surfaces exposed respectively on the inner surface of the cladding material and the surface of the core material by its etching effect.

Further, when the vapor-phase treating agent contains hydrogen, the hydrogen enters silica glass as an impurity and deteriorates the boundary condition of the cladding material and the core material.

Next, there will be explained the present invention by way of an embodiment.

An $Al_2O_3$-doped anhydrous silica glass rod produced by the plasma flame method is mechanically polished into a 10 mm $\phi$ core material. The core material is washed successively with trichloroethylene, methanol, distilled water, 10% HF and distilled water to be dried in a vacuum drier. On the other hand, a pure silica glass tube as a cladding material is washed in the same manner as the core material and then set on a glass lathe. The core material is inserted into the cladding material and heated up to 500°–16000° C. by using a resistance furnace, an oxy-hydrogen flame and the like. Thus, under heating up to the required temperature prior to the fusion of the core material and the cladding material, these two materials are vapor-phase treated by passing $CCl_4$ in a vapor state with $N_2$ gas through the clearance between these two materials. The impurities existing at the inner surface of the cladding material and the surface of the core material react with the $CCl_4$ to be removed as volatile chlorides. The thus vapor-phase treated two materials are fused immediately by increasing the temperature to be pulled, without exposure to the air or reattachment of impurities. Thus, there is produced an optical waveguide material which is extremely low in light attenuation, that is, extremely low in both light scattering loss and light absorption loss.

The vapor-phase treating temperature as above-mentioned is in the range of 500°–1600° C. When it is under 500° C., the removing action of the impurities is very slow and when above 1600° C., the silica glass softens and deforms remarkably, making the operation difficult. Even in the range of 500°–1600° C., when the temperature is above 1200° C., the silica glass becomes apt to deform. Therefore, in the heating of the core material and the cladding material, moving a local heating zone in the longitudinal direction of the cladding material with the core material inserted under a constant speed rotation thereof is preferable to an uniform heating along the full length of the cladding material.

The present invention provides, as described above, a method of producing an optical waveguide material of which light attenuation is remarkably lowered by improving the boundary condition of the core material and the cladding material, therefore it is industrially of great value.

The present invention will be understood more readily with reference to the following examples. The examples, however, are intended to illustrate the present invention and are not to be construed to limit the scope of the present invention.

EXAMPLE 1

A high purity synthetic silica glass rod containing $Al_2O_3$ of 4% is mechanically polished and then ultrasonic-washed successively in perchloroethylene, methanol, distilled water, 10% HF, and distilled water to be dried at 120° C. in an electric drier. This silica glass rod (diameter 10 mm) is inserted into a high purity synthetic silica glass tube (inner diameter 15 mm, outer diameter 19 mm) washed in the same manner as the silica glass rod. Then, a mixed gas consisting of $CCl_4$ as a vapor-phase treating agent 500 ml/min and $N_2$ gas 0.4 l/min is passed through the clearance between the silica glass tube and the silica glass rod and at the same time a local heating zone of 1400° C. using an oxy-hydrogen flame is repeatedly 20 times moved along the silica glass tube at a speed of 10 cm/min parallel to the flow direction of the mixed gas. Next, the mixed gas is replaced with $O_2$ gas and the heating is further 10 times repeated to remove carbon material deposited on the clearance by thermal decomposition of excess $CCl_4$. After that, the $O_2$ gas stream is stopped and the silica glass tube and the silica glass rod are fused by increasing the temperature further to be pulled into an optical fiber having a core diameter of 120 $\mu$m in the usual way. The light attenuation of the thus produced optical fiber is measured to be 3.9 dB/km at a 0.8 $\mu$m wavelength.

For comparison, in the case where the vapor-phase treatment using $CCl_4$ above mentioned is not carried out, the light attenuation of the produced fiber is 11.2 dB/km at a 0.8 $\mu$m wavelength.

EXAMPLE 2

A high purity silica glass rod with $Al_2O_3$ of 1.2% is mechanically polished and washed in the same manner as in Example 1 to be dried at 120° C. in an electric drier. This silica glass rod is inserted into a silica glass tube which has a cladding layer doped with $BCl_3$ formed at the inner surface thereof by a vapor-phase reaction, the cladding layer having a refractive index $N_D = 1.4515$ and a thickness of 0.5 mm. A mixed gas consisting of $SOBr_2$ 10 ml/min and $N_2$ gas 0.5 l/min is passed through the clearance between the silica glass tube and the silica glass rod and at the same time a local heating zone of 700° C. by the use of a town gas flame is moved repeatedly 15 times along the silica glass tube at a speed of 10 cm/min parallel to the flow direction of mixed gas. After that, only $N_2$ gas is further passed for 10 minutes and successively the silica glass tube and the silica glass rod are fused by further increasing the temperature to be pulled into a fiber having a core diameter of 120 $\mu$m in the usual way. The light attenuation of the thus produced optical fiber is measured to be 3.1 dB/km at a 0.8 $\mu$m wavelength.

For comparison, that of the optical fiber in the case where the vapor-phase treatment using $SOBr_2$ is not carried out is 10.5 dB/km at the same wavelength.

EXAMPLE 3–16

In each of Examples 3–16, an optical waveguide material is produced respectively by using a high purity synthetic silica glass rod having a refractive index $n_D = 1.4585$ as a core material and an oxy-hydrogen flame as a heat source and a vapor-phase treating agent respectively shown in the following table under a vapor-phase treating temperature respectively shown in the following table and the other conditions similar to those in Example 2.

In Examples 3, 8, 9 and 12, however, after the vapor-phase treatment using $CF_4$, $CCl_2F_2$, $C_2Cl_4$ and $CBr_4$ respectively, a moving heating by the use of the oxy-hydrogen flame is repeated 10 times under flow of $O_2$ gas at a flow rate of 0.5 l/min as in Example 1 to remove carbon material deposited.

The light attenuation at a 0.85 $\mu$m wavelength of the optical fiber produced respectively in each of Examples 3–16 is shown in the following table.

| Example No. | vapor-phase treating agent | vapor-phase treating temperature (°C.) | light attenuation (dB/km at a 0.85$\mu$m wavelength) |
| --- | --- | --- | --- |
| 3 | $CF_4$ | 1200 | 3.5 |
| 4 | $SF_6$ | 1200 | 3.1 |
| 5 | $SeF_6$ | 1200 | 3.6 |
| 6 | $SOF_2$ | 1200 | 2.9 |
| 7 | $SOCl_2$ | 1200 | 3.8 |
| 8 | $CCl_2F_2$ | 1200 | 3.3 |
| 9 | $C_2Cl_4$ | 1200 | 3.9 |
| 10 | $SCl_4$ | 1200 | 4.2 |
| 11 | $SeCl_4$ | 1200 | 4.5 |
| 12 | $CBr_4$ | 1200 | 5.0 |
| 13 | $S_2Br_2$ | 1200 | 4.8 |
| 14 | $Se_2Br_2$ | 1200 | 4.2 |
| 15 | $SeOF_2$ | 1200 | 3.2 |
| 16 | $SO_2Cl_2$ | 1200 | 3.8 |

For comparison, the light attenuation of an optical fiber in the case where such a vapor-phase treatment as in Examples 3–16 is not carried out is 10.1 dB/km at a 0.85 $\mu$m wavelength.

What is claimed is:

1. In the method of producing an optical waveguide material which comprises inserting a silica glass core material into a silica glass cladding material previously mechanically or chemically polished or heat treated respectively, making said core material and said cladding material fused by heating and pulling said fused core material and cladding material, improvements comprising passing a hydrogen-free compound containing at least one selected from the group consisting of C, N, O, S, Se and at least one of halogens in a vapor state through the clearance between said core material inserted and said cladding material prior to fusion thereof and vapor-phase treating the surfaces of said core material and said cladding material with said hydrogen-free compound under heating up to a high temperature.

2. A method of producing an optical waveguide material as claimed in claim 1, wherein said hydrogen-free compound is composed of one selected from the group consisting of $CF_4$, $CCl_4$, $C_2Cl_4$, $CBr_4$, $CCl_2F_2$, $CClF_3$, $SF_6$, $SCl_4$, $S_2Br_2$, $SOF_2$, $SOCl_2$, $SO_2Cl_2$, $SeF_6$, $SeCl_4$, $Se_2Br_2$, $SeOCl_2$, $SeOF_2$, $OF_2$, $N_3F$, and $F_2N_4$.

3. A method of producing an optical waveguide material as claimed in claim 1, wherein said vapor-phase treating temperature is in the range of 500°–1600° C.